Nov. 19, 1963     H. J. LOVEGROVE     3,111,596

SYNCHRONOUS ELECTRIC MOTOR

Filed Sept. 19, 1960

Inventor:
Henry Joseph Lovegrove
By
Attys.

United States Patent Office 3,111,596
Patented Nov. 19, 1963

3,111,596
SYNCHRONOUS ELECTRIC MOTOR
Henry Joseph Lovegrove, Hadley Wood, Barnet, England, assignor to Sangamo Electric Company, Springfield, Ill., a corporation of Delaware
Filed Sept. 19, 1960, Ser. No. 57,019
Claims priority, application Great Britain Sept. 22, 1959
3 Claims. (Cl. 310—41)

This invention relates to synchronous electric motors and is more particularly concerned with miniature single phase alternating current motors of the type widely employed for operating small load mechanical and electrical devices such as electric clocks, time switches, indicators, displays and so forth.

One object of the invention is the provision of an improved motor design of reduced physical size for a given torque output.

Another object of the invention is the provision of an improved miniature single phase synchronous electric motor having increased output torque for a given power input.

A further object of the invention resides in the provision of an improved rotor construction for a single phase synchronous electric motor.

Yet a further object of the invention resides in the provision of improved arrangements for ensuring starting and continued running of the motor in a chosen one of the two possible and opposing directions of rotor movement.

Yet a further object of the invention is the provision of an improved arrangement for controlling the direction of starting and running of the motor which is capable of ensuring according to the manner of assembly, running of the motor in either chosen one of the two alternative running directions.

One feature of the present invention resides in the use of an improved form of permanently magnetised multi-polar rotor in which each pole tooth has an arcuate circumferential width greater than the corresponding arcuate width of any one of the plurality of co-operating pole teeth of the stator. In a preferred constructional form according to the invention the arcuate width dimension for each pole tooth of the rotor is such that it subtends an angle which is of the order of 1.5 times the angle between the centres of adjacent pole teeth of the stator.

According to another aspect of the invention the synchronous motor is provided with a locking sprag or pawl-like element pivotally mounted on a fixed axis eccentric to the axis of rotation of the rotor, said sprag or pawl-like element forming part of a toothed disc which is arranged to be driven through slipping clutch means from the rotor in a manner whereby such sprag or pawl-like element is brought into locking engagement with an eccentrically disposed abutment on the rotor when the direction of rotation of the latter is incorrect but is moved to a position clear of the path of such eccentric abutment when rotation of the rotor is in the desired direction. In a preferred form of this aspect of the invention the aforesaid sprag or like element is shaped so as to be capable of disposition upon its mounting pivot in either of two alternative positions requiring respectively rotation in opposite directions to effect movement of said sprag or pawl into or out of locking position whereby any motor can be arranged for rotation in either one of the two alternative directions of rotation merely by appropriate choice of the position of assembly of such element upon its pivot.

In order that the above and other features and objects of the invention may be more readily understood, one particular practical embodiment will now be described in some detail with reference to the accompanying drawing wherein:

FIGURE 4 is an edge view of the element shown in FIGURE 3 while

Figure 1:
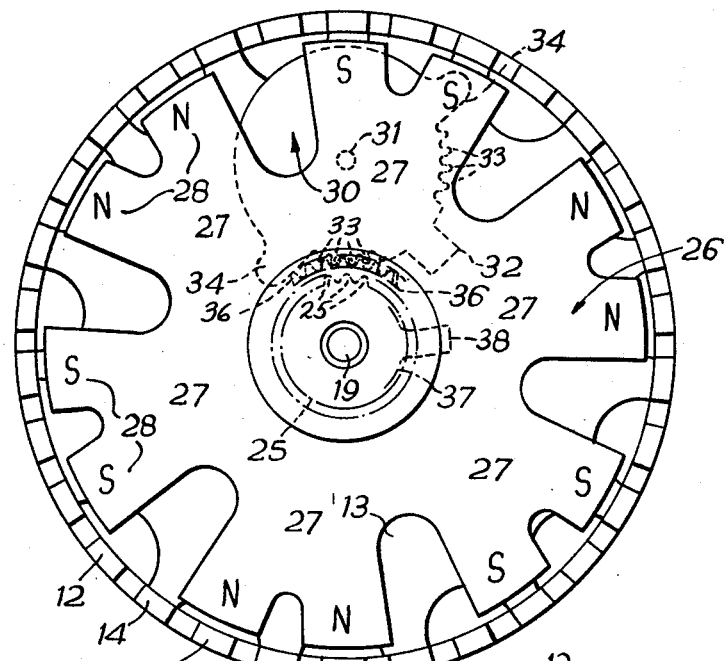
FIGURE 1 is an end elevational view of the motor showing the formation of the rotor disc and the relationship of the pole teeth thereof to the pole teeth of the surrounding stator.

Referring to the drawings, the motor comprises a central core of ferromagnetic material of low retentivity. Such core is of circular cross-section and is bored axially at 40. Such axial bore is counterbored at its forward end to receive a first bearing bush 17 of anti-friction metal and is also counterbored at its rearward end to receive a second bearing bush 18 also of anti-friction metal. Towards its rearward end the core 10 is reduced in diameter to form a rearward extension 22 which is externally screw threaded for the reception of a nut 23 usable to secure the motor in the desired operative position upon the apparatus with which it is associated.

Upon the shoulder formed by the reduction of diameter to extension 22 is fitted a cup-shaped stator shell 11, such shell being also of ferromagnetic material of low retentivity and being rigidly secured to the core 10 in good magnetic flux transfer relationship therewith by outward displacement of a web 41 of the core material on to the coned surface 42 of a central aperture in the radial end wall of the stator shell 11. The forward end of the core 10 is also reduced to form a shoulder 43 against which a second cup-shaped stator shell 13 of low-retentivity ferromagnetic material is rigidly secured in good magnetic flux transfer relationship to the core in broadly similar manner to the shell 11 by outward displacement of core material against the conical surface of a central aperture in the shell. In between the two stator shells 11 and 13 and surrounding the central, largest diameter, portion of the core 10 is disposed an electromagnet winding 15 enclosed within a moulded protective casing 16 of insulating material, the latter being formed in two parts having a telescoping division region around the outer wall to form a substantially sealed enclosure for the winding. The two end connections of such winding are brought out by way of flexible leads 44 which pass through a rearwardly projecting block 45 of insulating material which is formed integrally with the rearward half of the casing 16 and which passes through an appropriately shaped aperture in the end wall of the shell 11.

As seen more clearly in FIGURE 1 the stator shell 11, which is of substantially greater axial length than the shell 13, is divided around its marginal forwardly directed edge into a plurality e.g. fifteen as in the particular example illustrated, equi-spaced pole-forming teeth 12. The second stator shell 13 is likewise provided around its forwardly directed marginal edge with a similar number of equi-spaced pole-forming teeth 14. The arcuate width dimension of each of the teeth 12 is equal to that of each of the teeth 14 and the relative dimensions and positions of assembly of the respective cup-shaped shells 11 and 13 upon the core 10 is such that the teeth 14 are interleaved with the teeth 12 to form a ring-like assemblage of, e.g. 15, stator pole pairs concentric with the axis of the core 10. When the winding 15 is energised alternate teeth of such assemblage become magnetised with opposite polarities.

The rotor comprises a generally disc-shaped member 26 of permanently magnetisable material formed as shown more clearly in FIG. 1 to provide six major poles 27 each of which is bifurcated to form two minor pole teeth 28. This disc member 26 is preferably formed of sintered Alnico and is permanently magnetised so that adjacent major poles are of unlike polarity, each of the minor pole teeth of any one major pole being, of course of the same polarity. The centre-to-centre angular spacing between adjacent minor pole teeth 28 is equal to twice the angular spacing between adjacent pole teeth of the stator. That is to say, in the particular example illustrated where there is a total of thirty stator pole teeth and a resultant centre-to-centre angular spacing of 12° between adjacent stator pole teeth, the angular spacing between adjacent minor pole teeth 28 is equal to 24°. The angle subtended by each minor pole tooth 28 at the region facing the stator pole teeth is made, as shown, considerably greater than the angle subtended by any one stator pole tooth and is preferably made substantially equal to the angle subtended between adjacent facing edges of two like i.e. alternate, stator pole teeth or about 1.5 times the angle between the centres of adjacent stator pole teeth. Thus if each stator tooth subtends an angle of 7° and the gap between adjacent stator pole teeth is 5° then the angle subtended by each minor rotor pole tooth 28 is preferably of the order of 17–18°. The gap between each pair of minor pole teeth 28 of one major pole 27 is approximately equal in width to the arcuate width of one stator pole tooth. Such extended arcuate width of the rotor pole teeth has been found greatly to improve the power output and efficiency of the motor.

The rotor magnet disc 26 is rigidly secured at its centre to a bushing 24 and the latter in turn is rigidly secured to a rotor spindle 19 which is rotatably supported in the bearing bushings 17 and 18. The forward end of the spindle 19 has rigidly mounted thereon a drive pinion 25 while the rearward end of the spindle 19 is formed with a flattened end surface to act as a thrust surface in engagement with a thrust ball 20 housed within a counterbore or recess 47 in the rearward end bushing 18. On the opposite side such ball 20 is in engagement with a retaining cloture plate or disc 21 which is held within the counterbore of the core 10 receiving the bushing 18 and is held in place by upsetting or peening over the surrounding edge of the body of the core extension 22 so as to enclose and seal the rearward end of the drive spindle.

The bushing 24 has a first reduced diameter region 48 for receiving the rotor magnet disc 26 and is then further reduced towards its rearward end to provide a rotational bearing surface 49 for a pinion 36. A still further reduced diameter region 50 of the bushing 24 provides a seating for a retaining plate 37 which is rigidly secured to the bushing 24 as by force-fitting or upsetting. Such retaining plate 37 is arranged to retain the pinion 36 whereby the latter has a light frictional driving connection with the bushing 24 but can nevertheless rotate relatively freely upon such bushing if necessary. The plate 37 is provided with an outwardly directed radial projection or abutment 38 integral therewith.

Figure 5:
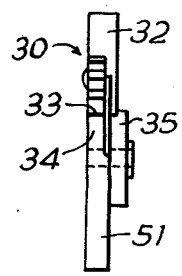
FIGURE 5 is a further edge view taken at right angles to that of FIGURE 4.
Figure 3:
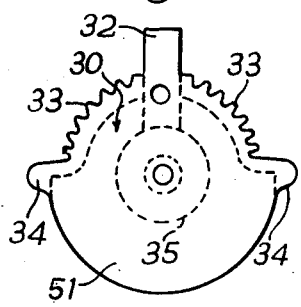
FIGURE 3 is an elevational view, taken in an axial direction, of the sprag or pawl like element of the direction control means.
Figure 4:
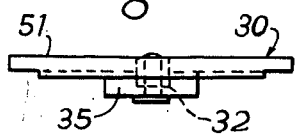
Figure 2:
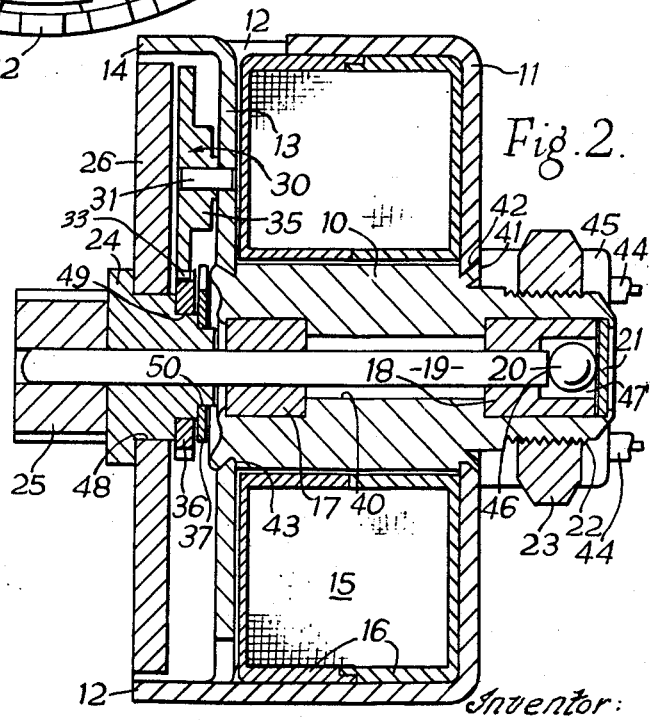
FIGURE 2 is an axial cross-section through the motor construction shown in FIGURE 1.

The rotational direction control means comprise a sprag or pawl member 30, shown more clearly in FIGS. 3, 4 and 5. This member 30 comprises a generally disc-shaped body part 51 having a radial lug 32 which is relatively thick in the depth or axial direction of the member 30. This lug is flanked on each side by arcuate toothed regions 33 formed in edge parts of the body part 51, each toothed region terminating in a shorter radial projection 34 with the two projections disposed approximately diametrically opposite to one another. The member 30 is further provided with an integral boss 35 on its rearward surface and is bored centrally to be received, in a freely rotatable manner, upon a pivot stud 31 which is rigidly secured to and projects forwardly from the radial end wall of the forward stator shell 13. The member 30 is positioned upon the stud 31, during assembly of the motor, so that either the toothed region 33 on one side of the radial lug 32 or the similar region on the other side of said lug is in proper meshing engagement with the teeth of the pinion 36. The axial dimension of the boss 35 is such that while such toothed regions 33 can engage with the pinion 36, only the thick radially projecting lug 32 lies in the path of rotational movement of the radial projection 38 of the plate 37 as the latter rotates in unison with the rotor disc 26. The member 30 is preferably made of a suitable plastic material, e.g. of moulded nylon.

In the operation of such direction control means, the permissible direction of rotation of the rotor is governed by the initial placing of the member 30 by choice of which of the two arcuate regions 33 is in meshing engagement with the pinion 36. Thus with the member 30 positioned as shown in FIG. 1, rotation of the rotor 26 in the correct, i.e. clockwise direction causes, through the light frictional coupling between the pinion 36 and the rotor bushing 24, an anticlockwise movement of the member 30 whereby it is moved into the position shown where one of the rounded projections 34 thereof bears lightly upon the periphery of the pinion 36. After the arrival of the parts at this position, the pinion 36 slips upon the bushing 24 with continued rotation of the rotor. In this position of the member 30 the thick radial lug 32 is positioned clear of the path of rotation of the projection 38 of the plate 37 rigid with the rotor and continuous rotation of the rotor in such clockwise direction is accordingly allowed to proceed unhindered. If, however, upon initial energisation the rotor commences to rotate in the wrong, i.e. anticlockwise direction, the aforesaid light frictional coupling between the pinion 36 and the bushing 24 causes rotation of the member 30 in clockwise direction to bring the thick radial lug 32 into resting engagement upon the teeth of the pinion 36; while in this position during continued rotation of the rotor it is engaged by the radial projection 38 of the plate 37. Since the latter is rigidly secured to the rotor, the rotor is arrested and during the next half cycle of the input current to the winding 15 when the stator pole polarities reverse the rebound movement initiates rotor movement in the opposite or correct clockwise direction. Thereafter the rotor continues to rotate in such correct clockwise direction as already described above.

If anticlockwise motion of the rotor is desired instead of clockwise as already described, then the member 30 is positioned so that the opposite toothed region 33 to that shown in FIG. 1 is in meshing engagement with the pinion 36. Now anticlockwise motion of the rotor is necessary to bring a short radial projection 34 into bearing engagement upon the teeth of the pinion 36 and thereby to permit continued rotor movement by displacement of the thick lug 32 out of the path of the projection 38 of the plate 37. Should clockwise movement of the rotor occur then the lug 32 will be brought to bear upon the pinion 36 with resultant positioning of such lug in the path of movement of the projection 38 of the plate 37. Reversal of rotor movement to the desired anticlockwise direction then occurs upon reversal of magnetisation of the stator pole teeth in the next following half cycle in the input alternating current.

While one particular arrangement employing fifteen stator pole pairs and six major rotor poles each bifurcated into two spaced minor pole teeth has been described, it will be apparent that the number of stator poles and the number of major and minor poles of the rotor may be widely varied. The particular fifteen stator pole pair construction shown is one specifically designed to provide a rotor speed of 200 revolutions per minute with a 50 cycle per second alternating current input. The number of stator poles is dependent upon the desired rotor speed and the frequency of the alternating current input, and may be calculated from the usual formula, $f=NP/60$ where $f$ is the frequency in cycles per second, N is the speed in r.p.m. and P is the number of stator pole pairs. Thus to provide 200 r.p.m. with a 60 cycle per second input current the number of stator pole teeth pairs would be 18 and so on.

I claim:
1. In a self-starting synchronous electric motor comprising a stator structure, a winding thereon, and a rotor responsive to the energization of said stator structure through the energization of said winding, which rotor can start in either direction of rotation, depending upon the direction of the cycle of the initial flow of current entering said winding, the combination therewith of mechanism for compelling said rotor to rotate in a predetermined direction in its running operation comprising:
 (a) a positive drive abutment having a positively driven connection with said rotor to rotate continuously therewith,
 (b) a slippage driving pinion having a continuous circle of pinion gear teeth formed around its periphery,
 (c) slippage driving means for transmitting a slippage drive from said rotor to said slippage driving pinion,
 (d) a direction predetermining sprag rotatably mounted on a pivot axis which is disposed eccentrically of the axis of said rotor,
 (e) said sprag having a limited range of oscillation on said pivot axis,
 (f) a blocking abutment carried by said sprag which is adapted to be driven into a position for blocking further rotation of said positive drive abutment when the direction of rotation of said rotor is counter to the desired predetermined direction of rotation,
 (g) said sprag having the aforesaid blocking position to block rotation of said positive drive abutment and also having a clearing position with its blocking abutment moved clear of the path of said positive drive abutment when the rotor revolves in the desired direction of rotation,
 (h) a stop projection on said sprag operative to engage a cooperating stop surface when said sprag has been driven into said clearing position,
 (i) and a sector of gear teeth on said sprag meshing with the pinion teeth on said slippage driving pinion for receiving a slippage drive in either direction of rotation depending upon the initial starting direction of said rotor,
 (j) said sector gear teeth remaining permanently in mesh with the pinion gear teeth on said slippage driving pinion.

2. In a self-starting synchronous electric motor comprising in combination:
 (a) a stator structure comprising front and rear nesting cup-shaped stator members of different depths and having their web portions spaced from each other,
 (b) an energizing winding mounted between said web portions,
 (c) each of said cup-shaped stator members having a set of annularly spaced projecting pole teeth formed around the edge of its forwardly extending rim,
 (d) the two sets of pole teeth of the two stator members being arranged in predetermined sequence to establish a rotating magnetic field,
 (e) a rotor revolvably mounted within said rotating magnetic field,
 (f) which rotor can start in either direction of rotation depending upon the direction of the cycle of the initial flow of current entering said winding,
 (g) and direction predetermining mechanism for compelling said rotor to rotate in a predetermined direction in its running operation,
 (h) said direction predetermining mechanism being mounted between the web portion of said front cup-shaped stator member and said rotor.

3. The combination of claim 2 wherein said direction predetermining mechanism comprises:
 (a) a positive drive abutment rotating constantly with said rotor,
 (b) a sprag mounted for rotation about an axis spaced from the axis of said rotor,
 (c) a blocking abutment carried by said sprag adapted in one direction of rotation of said sprag to be moved into blocking position for blocking the rotation of said positive drive abutment and said rotor,
 (d) a stop carried by said sprag adapted to engage a cooperating stop surface when said sprag is rotated in the opposite direction, whereby to stop such opposite direction of rotation when said sprag is in a clearing position with its blocking abutment out of the path of rotation of said positive drive abutment,
 (e) a slippage driving pinion having driving gear teeth thereon,
 (f) driven gear teeth on said sprag meshing with said driving gear teeth,
 (g) and slippage means transmitting a slippage drive from said rotor to said slippage pinion,
 (h) said driving and driven gear teeth remaining in permanently meshing relation.

References Cited in the file of this patent
UNITED STATES PATENTS 2,493,999 Riley _____ Jan. 10, 1950
2,985,778 Fritz _____ May 23, 1961